(12) United States Patent
Choi et al.

(10) Patent No.: US 9,420,592 B2
(45) Date of Patent: Aug. 16, 2016

(54) METHOD AND APPARATUS OF INTERFERENCE AVOIDANCE BASED ON MULTI TRANSMISSION AND RECEPTION

(71) Applicant: Electronics and Telecommunications Research Institute, Daejeon (KR)

(72) Inventors: Byeong Cheol Choi, Daejeon (KR); Jae Hong Ruy, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 69 days.

(21) Appl. No.: 14/459,188

(22) Filed: Aug. 13, 2014

(65) Prior Publication Data

US 2015/0133055 A1    May 14, 2015

(51) Int. Cl.
| | | |
|---|---|---|
| H04W 72/08 | (2009.01) | |
| H04W 4/00 | (2009.01) | |
| H04W 84/18 | (2009.01) | |
| H04L 1/00 | (2006.01) | |

(52) U.S. Cl.
CPC .............. *H04W 72/082* (2013.01); *H04L 1/00* (2013.01); *H04W 4/008* (2013.01); *H04W 84/18* (2013.01)

(58) Field of Classification Search
CPC ... H04W 72/082; H04W 4/008; H04W 84/18; H04W 16/14; H04W 72/121; H04W 84/12; H04L 1/00
See application file for complete search history.

(56) References Cited

U.S. PATENT DOCUMENTS

| | | | | |
|---|---|---|---|---|
| 6,922,551 | B1 * | 7/2005 | Bristow | H04W 16/14 455/103 |
| 8,885,499 | B2 * | 11/2014 | Ponnuswamy | H04L 41/22 370/252 |
| 2007/0160020 | A1 * | 7/2007 | Osann | H04L 45/24 370/338 |
| 2007/0258508 | A1 * | 11/2007 | Werb | H04W 84/18 375/140 |
| 2008/0137620 | A1 * | 6/2008 | Wang | H04L 1/20 370/337 |
| 2009/0325486 | A1 * | 12/2009 | Kim | H04W 72/082 455/41.2 |
| 2012/0119902 | A1 * | 5/2012 | Patro | H04L 12/12 340/502 |
| 2013/0023214 | A1 * | 1/2013 | Wang | A61B 5/0002 455/41.2 |
| 2014/0328194 | A1 * | 11/2014 | Sen | H04W 72/082 370/252 |
| 2015/0189668 | A1 * | 7/2015 | Abdelmonem | H04L 5/0026 370/252 |
| 2015/0288532 | A1 * | 10/2015 | Veyseh | H04L 12/283 370/310 |

FOREIGN PATENT DOCUMENTS

| | | | |
|---|---|---|---|
| KR | 10-2008-0016337 A | | 2/2008 |
| MY | WO2013137709 | * | 9/2013 |

* cited by examiner

*Primary Examiner* — Sujatha Sharma

(57) ABSTRACT

Disclosed is a method of avoiding channel interference by a sensor node including a multi transmission and reception unit in a wireless sensor network. The method includes setting channel A in channel group A for a first wireless transmission and reception unit, and setting channel B in channel group B for a second wireless transmission and reception unit, checking interference for the channel A, detecting interference for the channel B if interference is detected in the channel A, and performing communication through a channel where interference has not been detected among the channel A and the channel B.

17 Claims, 7 Drawing Sheets

METHOD AND APPARATUS OF INTERFERENCE AVOIDANCE BASED ON MULTI TRANSMISSION AND RECEPTION

Priority to Korean patent application number 10-2013-0136668 filed on Nov. 12, 2013, the entire disclosure of which is incorporated by reference herein, is claimed.

BACKGROUND OF THE INVENTION

1. Field of the Invention

The present invention relates to wireless communication, and more particularly, to a method and apparatus for avoiding interference based on multi transmission and reception in a wireless communication system.

2. Discussion of the Related Art

ZigBee refers to one of IEEE 802.15.4 standards which support the short distance communication. The ZigBee sensor network technology is a technology for a short range communication and ubiquitous computing in a wireless networking field such as a home and an office. The ZigBee sensor network is for detecting surrounding information by distributing hundreds or thousands of sensor nodes in a wide landform, and generating data on the detected surrounding information and transmitting the generated data to an information connection device in a far place, and is mainly used for an intelligent home network, a short range communication such as the building, industrial device automation, environment monitoring, a telematics, a military, and emergency situation monitoring, etc. In this case, the sensor nodes generate data for the detected surrounding information, and perform a role of a router which transmits data received from other sensor nodes to the next sensor node.

The ZigBee sensor network uses an industrial scientific medical (ISM) band, and one channel bandwidth is relatively narrow as approximately 2 MHz, and thus the channel bandwidth is significantly affected by the wireless channel interference. For example, when the ZigBee sensor network and the WiFi network overlap and are set to use adjacent frequency bands, interference is generated in the wireless signals, and thus the frame transmission delay irregularly increases in the sensor nodes of the ZigBee sensor network and the communication becomes impossible. In such an interference environment, there is a need for a scheme for avoiding interference in order to secure reliable wireless communication of the ZigBee sensor network.

SUMMARY OF THE INVENTION

An object of the present invention is to provide a method and apparatus for avoiding a multi transmission and reception based interference.

Another object of the present invention is to provide a method and apparatus for avoiding interference in a wireless communication system.

Another object of the present invention is to simultaneously examine two or more wireless channels and avoid interference.

Another object of the present invention is to reduce a channel change according to interference in a wireless communication system.

In accordance with an aspect of the present invention, a method of avoiding channel interference by a sensor node including a multi transmission and reception unit in a wireless sensor network includes setting channel A in channel group A for a first wireless transmission and reception unit, and setting channel B in channel group B for a second wireless transmission and reception unit, checking interference for the channel A, detecting interference for the channel B if interference is detected in the channel A, and performing communication through a channel where interference has not been detected among the channel A and the channel B.

In accordance with another aspect of the present invention, a sensor node including a multi transmission and reception unit which performs channel interference avoidance in a wireless sensor network includes a first wireless transmission and reception unit which checks interference on channel A, a second wireless transmission and reception unit which checks interference on channel B, and a central controller which sets the channel A among channels included in channel group A in the first wireless transmission and reception unit, and sets the channel B among channels included in channel group B in the second wireless transmission and reception unit, wherein the central controller controls data to be transmitted or received through a wireless transmission and reception unit in which a channel, where interference has not been detected is set, among the channel A and the channel B.

In accordance with yet another aspect of the present invention, a method of avoiding channel interference by a sensor node including a multi transmission and reception unit in a wireless sensor network includes setting channel A among channels included in channel group A in a first wireless transmission and reception unit, setting channel B among channels included in channel group B in a second wireless transmission and reception unit, checking interference on the channel A through the first wireless transmission and reception unit, checking interference on the channel B through the second wireless transmission and reception unit, and performing communication through a wireless transmission and reception unit in which a channel, where interference has not been detected, among the channel A and the channel B.

DETAILED DESCRIPTION OF THE EMBODIMENTS

Figure 1:
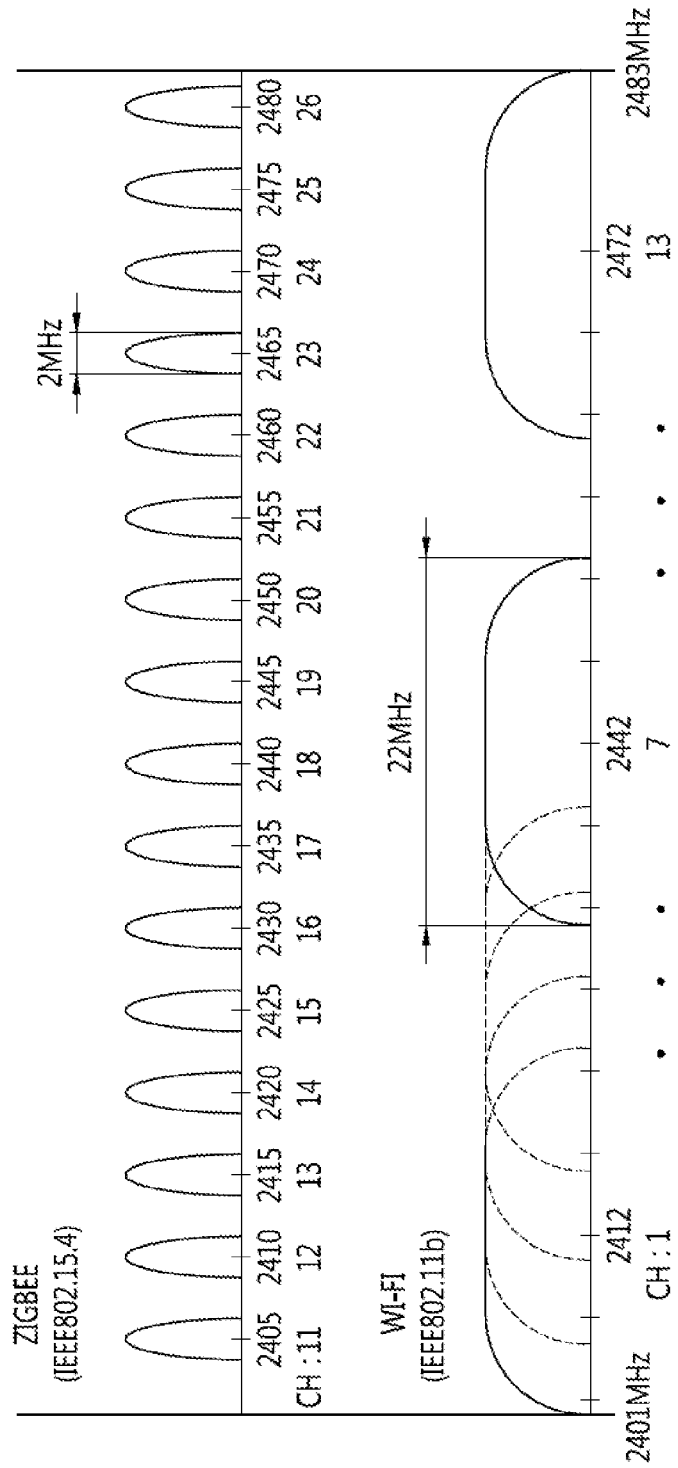
FIG. 1 shows a wireless channel band which is used in ZigBee communication and WiFi communication.

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

The present invention suggests a method of sensing channel interference (or collision) and changing to an available channel in order for a sensor node to avoid interference by another network such as WiFi network in a wireless sensor network. Furthermore, in the present invention, a multi transmission and reception unit may be used to reduce the time which is used in sensing the channel interference from one transmission and reception unit and a change to an available channel, and even if an interference phenomenon happens for the channel used in one transmission and reception unit, the number of times of cases of the channel change to the interference may be reduced by performing wireless communication through another transmission and reception unit, thereby allowing quick wireless data transmission.

FIG. 1 shows a wireless channel band which is used in ZigBee communication and WiFi communication.

Referring to FIG. 1, the ZigBee communication which follows the IEEE802.15.4 standard provides 16 channels in 2.4 GHz band, and one channel bandwidth is 2 MHz. The central frequency of channel 11, which is the first channel of 16 channels, is 2405 MHz, and the central frequency of each channel is placed away at 5 MHz intervals.

In contrast, the Wi-Fi, which follows IEEE802.11b standard, is composed of 13 channels of 2.4 GHz band. The bandwidth of one channel is 22 MHz, the central frequency of channel 1 of the first of the 13 channels is 2412 MHz, the central frequency of each channel is placed away at 5 MHz intervals, and respective channels overlap each other.

Hence, as shown in FIG. 1, one channel for Wi-Fi communication overlaps with 4 or 5 channels for ZigBee communication. The channel overlapping between other communication systems becomes the cause of the wireless communication interference in the ZigBee sensor network.

Figure 2:
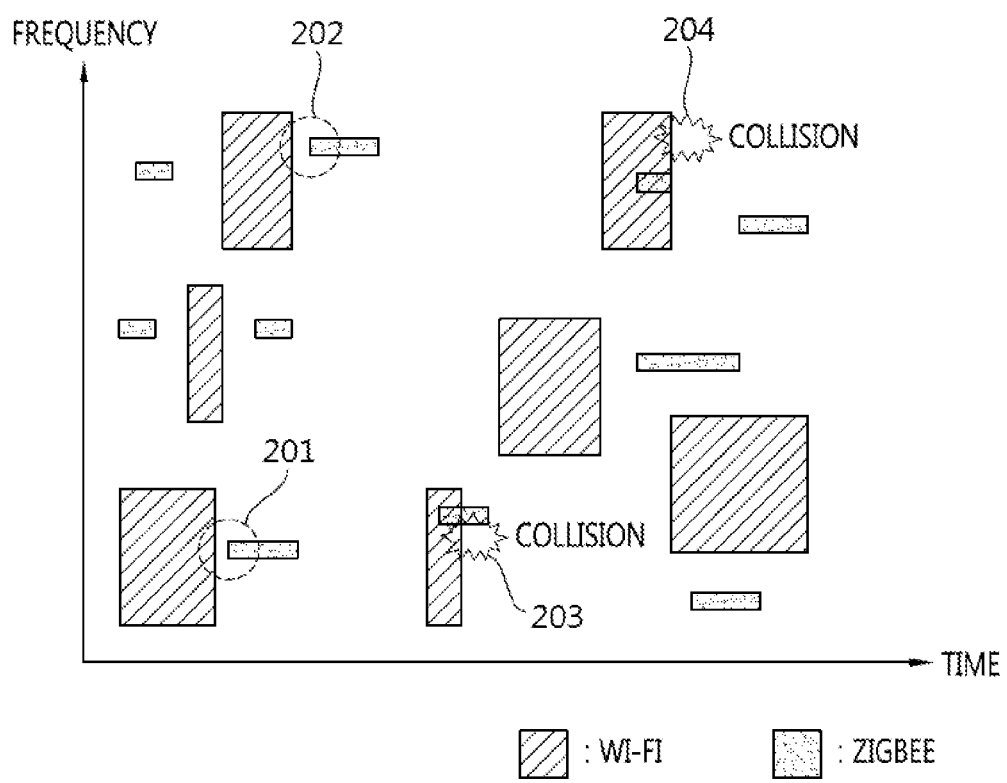
FIG. 2 shows an example of a wireless communication interference and transmission collision between ZigBee network and WiFi network.

FIG. 2 shows an example of a wireless communication interference and transmission collision between ZigBee network and WiFi network.

Referring to FIG. 2, y-axis denotes the frequency band, and x-axis denotes the time of data (or packet) transmission. Furthermore, the shaded block represents the area where the Wi-Fi data (or packet) is transmitted, and the dotted block represents the area where the Zig-Bee data (or packet) is transmitted.

In area 201 and area 202, the Wi-Fi band and ZigBee band overlap, but there is no mutual interference because the transmission time is different. However, in the case of area 203 and area 204, the frequency band and time in which the Wi-Fi data is transmitted overlaps with the frequency band and time in which the ZigBee data is transmitted, and thus the error of the data transmission is generated along with the transmission collision due to interference. In order to avoid such a transmission collision and to transmit data successfully, there is a need for a scheme of detecting the interference situation and avoiding the interference for the transmission channel.

Figure 3:
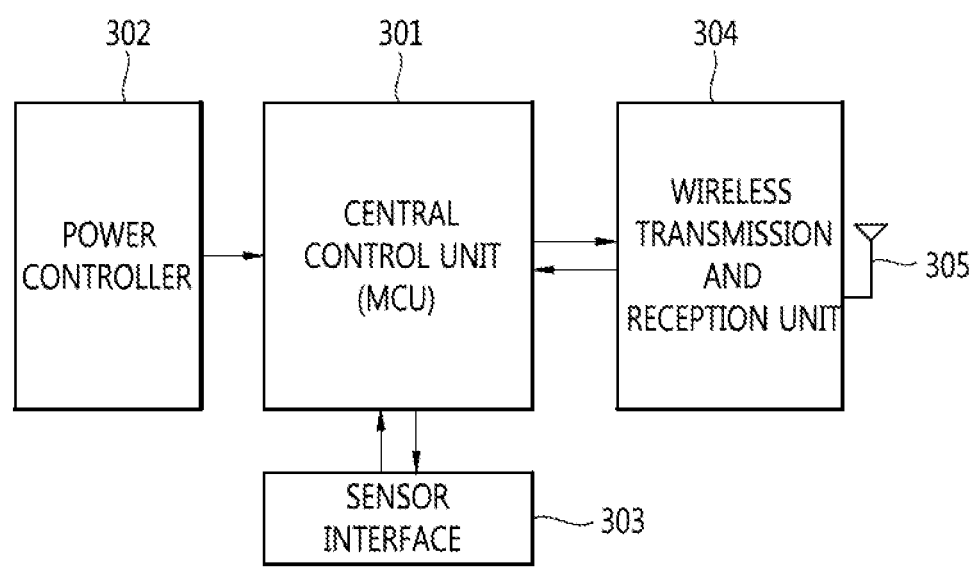
FIG. 3 is a block diagram of a sensor node including a single transmission and reception module.

FIG. 3 is a block diagram of a sensor node including a single transmission and reception module.

Referring to FIG. 3, the sensor node includes a central control unit 301, a power control unit 302, a sensor module interface 303, a wireless transmission and reception unit 304, and an antenna 305. Here, the central control unit 301 may be called a machine control unit (MCU).

The central control unit 301 performs initialization of the sensor node, overall control, and the data processing function. The power control unit 302 performs a power supply and management function to the sensor node. The sensor module interface 303 senses surrounding information. The wireless transmission and reception unit 304 performs wireless transmission and reception function on at least one physical layer channel through the antenna 305. The wireless transmission and reception unit 304 may operate based on IEEE802.15.4. That is, the wireless transmission and reception unit 304 may perform wireless communication using arbitrary one channel among 16 channels used in ZigBee communication.

Figure 4:
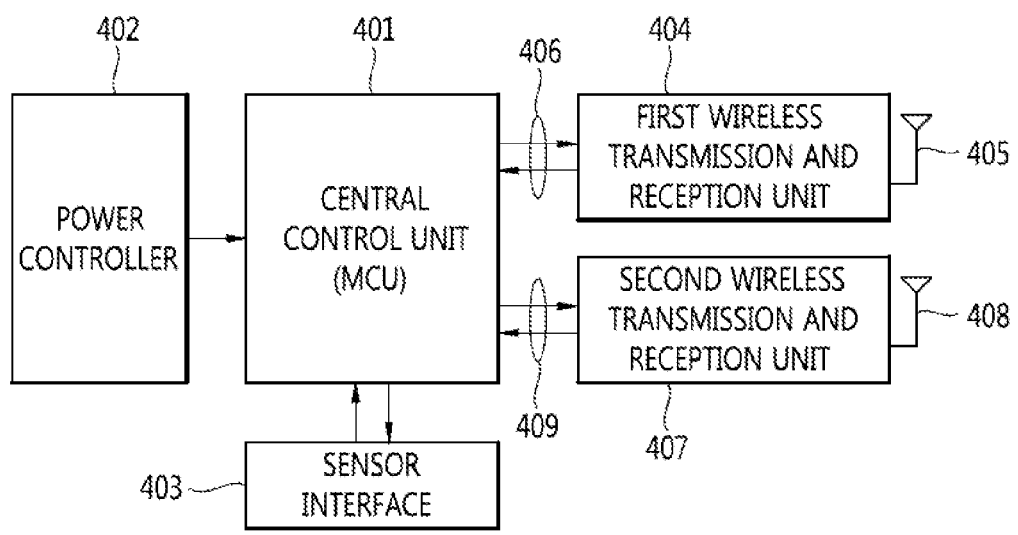
FIG. 4 is a block diagram showing a multi transmission and reception sensor node for channel-interference avoidance.

FIG. 4 is a block diagram showing a multi transmission and reception sensor node for channel-interference avoidance. Here, the multi transmission and reception sensor node refers to a sensor node including a multi transmission and reception unit.

Referring to FIG. 4, the multi transmission and reception sensor node includes a central control unit 401, a power control unit 402, a sensor module interface 403, a wireless transmission and a first reception unit 404, a first antenna 405, a second wireless transmission and reception unit 407, and a second antenna 408. Furthermore, the multi transmission and reception sensor node includes a first serial data transmission and reception interface 406 for data transmission and reception between the central control unit 401 and the first wireless transmission and reception unit 406, and includes a second serial data transmission and reception interface 409 for data transmission and reception between the central control unit 401 and the second wireless transmission and reception unit 407. Here, the central control unit 401 may also be called MCU as described above.

The central control unit 401 performs initialization of the sensor node, overall control, and the data processing function. The power control unit 402 performs the power supply and management function to the sensor node. The sensor module interface 403 senses the surrounding information. The first wireless transmission and reception unit 404 and the second wireless and transmission and reception unit 407 may respectively perform the wireless transmission and reception function on at least one physical layer, and may be independently operated. The first wireless transmission and reception unit 404 and the second wireless transmission and reception unit 407 may operate based on IEEE802.15.4. That is, the first wireless transmission and reception unit 404 and the second wireless transmission and reception unit 407 may perform wireless communication using one arbitrary channel among 16 channels used in ZigBee communication. The first antenna 405 is connected to the first wireless transmission and reception unit 404, and the second antenna 208 is connected to the second wireless transmission and reception unit 407.

The first wireless transmission and reception unit 404 and the wireless transmission and reception unit 407 perform the function of detecting the channel interference for performing the interference avoidance function.

Figure 5:
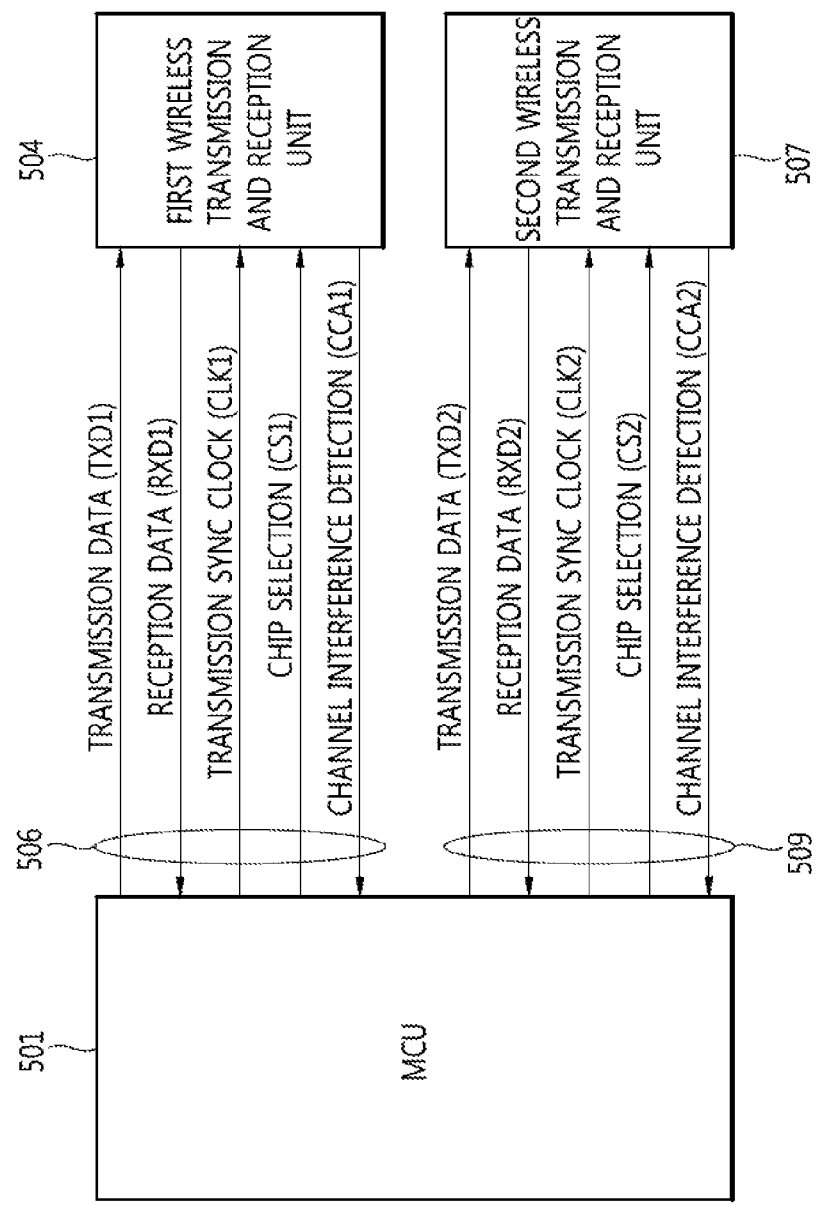
FIG. 5 shows an example of an interface between wireless transmission and reception units of a multi transmission and reception sensor node.

FIG. 5 shows an example of an interface between wireless transmission and reception units of a multi transmission and reception sensor node.

Referring to FIG. 5, a central control unit 501, which forms the multi transmission and reception sensor node, is matched to a first wireless transmission and reception unit 504 and a first serial data transmission and reception interface 506, and is matched to a second wireless transmission and reception unit 507 and a serial data transmission and reception interface 509. Information signals about the transmission data, the reception data, the transmission synchronization clock, chip selection, wireless data reception interruption, and channel interference detection are transmitted through the first serial data transmission and reception interface 506 and the second serial data transmission and reception interface 509.

The first wireless transmission and reception unit 504 and the second wireless transmission and reception unit 507 perform the detection function for the channel interference for performing the interference avoidance function. For example, if the first wireless transmission and reception unit 504 or the second wireless transmission and reception unit 507 receives a command to scan the wireless energy for a particular channel from the central control unit 501, the first wireless transmission and reception unit 504 or the second wireless transmission and reception unit 507 measures the wireless reception sensitivity for the channel, and when the measured value is a determined threshold or greater, the first wireless transmission and reception unit 504 or the second wireless transmission and reception unit 507 may transmit the channel clear assignment (CCA) signal, which indicates the state of the channel interference, to the central control unit 501. In this case, the multi transmission and reception sensor node may independently use different wireless channels and detect the interference through each of the first wireless transmission and reception unit 504 or the second wireless transmission and reception unit 507. In this case, the multi transmission and reception sensor node may use one wireless transmission and reception unit for transmission, and may use another wireless transmission and reception unit for reception. In this case, the transmission and reception may be simultaneously performed, and thus the performance of the wireless transmission and reception may be improved.

Furthermore, when the wireless data transmission and reception is being performed through the first wireless transmission and reception unit 504, if the interference phenomenon is detected in the wireless channel of the first wireless transmission and reception unit 504 and there is no interference phenomenon in the wireless channel of the second wireless transmission and reception unit 507, the central control unit 501 may transmit and receive wireless data promptly through the second wireless transmission and reception unit 507 without performing the channel change function due to the interference. In this case, the multi transmission and reception sensor node has the redundancy of the channel for the wireless interference, and thus when an interference phenomenon occurs during the data transmission through one wireless transmission and reception unit, the data transmission may be promptly performed through another transmission and reception unit without performing the channel change function of the wireless transmission and reception unit, and thus the transmission delay due to the channel change performed in one wireless transmission and reception unit may be prevented.

The method of detecting the interference and avoidance performed in the multi transmission and reception sensor node according to the present invention is described in detail below.

Figure 6:
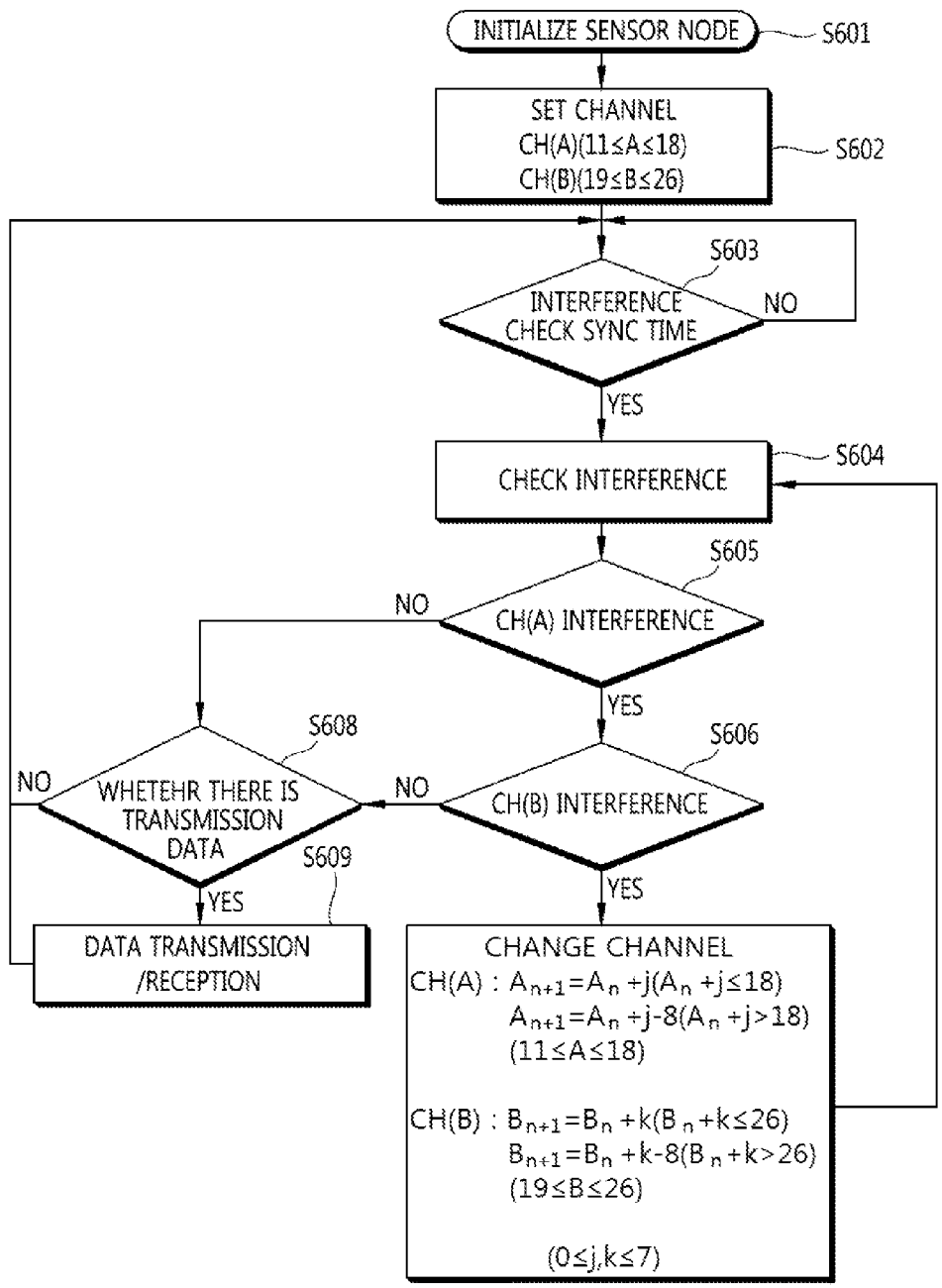
FIG. 6 is a flowchart illustrating a method of detecting and avoiding interference by a multi transmission and reception sensor node, according to the present invention.

FIG. 6 is a flowchart illustrating a method of detecting and avoiding interference by a multi transmission and reception sensor node, according to the present invention.

The ZigBee wireless sensor network is composed of a coordinator node, which becomes the main body of the network configuration and synchronized signal control, and a general sensor node. The coordinator node and the sensor node may be temporarily and internally synchronized by the mutual synchronization signal. In this case, the coordinator node and the sensor node may minutely form visual synchronization through the internal clock or timer. FIG. 6 illustrates the method of detecting and avoiding the interference according to the present invention based on the sensor node, but the method may be performed by the operation synchronized between the coordinator node and the sensor node.

Referring to FIG. 6, the sensor node (and the coordinator node) performs initialization (S601) and performs the channel setting (S602). In this case, channel A may be allocated to the first wireless transmission and reception unit, and channel B may be allocated to the second wireless transmission and reception unit. In this case, the central control unit of the sensor node (or coordinator node) may divide a total of 16 channels from channel 11 to channel 26, which are used in the ZigBee wireless sensor network, into two channel groups (channel group A and channel group B) so as not to overlap each other, and then allocate the divided channels to the first wireless transmission and reception unit and the second wireless transmission and reception unit. For example, the central control unit may set the channel numbers 11 to 18 to channel group A and may set channel numbers 19 to 26 to channel group B. Furthermore, in the first wireless transmission and reception unit, one of the channels of channel group A may be allocated to channel A, and in the second wireless transmission and reception unit, one of the channels of channel group B may be allocated to channel B.

After the channel setting, the sensor node sets the interference check synchronization time based on the coordinator node and the mutual synchronization clock (S603) and performs the interference check for two wireless channels which are channel A and channel B (S604). The reception energy sensitivity of the channel may be measured first, and then he interference check may be performed based on the measured reception energy sensitivity.

The sensor node determines whether the interference has been detected in channel A of the first wireless transmission and reception unit (S605).

In S605, when the interference is not detected in channel A of the first wireless transmission and reception unit, the sensor node determines whether there is transmission data regardless of the result of the interference check (S608), and if there is the transmission data, data is transmitted on channel A through the first wireless transmission and reception unit.

In operation S605, when the interference is detected in channel A of the first wireless transmission and reception unit, the sensor node checks whether the interference of channel B of the second wireless transmission and reception unit is detected (S606). When the interference is not detected in channel B of the second wireless transmission and reception unit in operation S606, the sensor node determines whether there is transmission data (S608), and if there is transmission data, data is transmitted on channel B through the second wireless transmission and reception unit.

If the interference phenomenon is generated only on the channel of the wireless transmission and reception unit of one of two channels of the two wireless transmission and reception units, the data may be promptly transmitted and received through the available channel of the wireless transmission and reception unit where the interference does not occur without a need for performing the channel change process.

Furthermore, when the interference is detected in channel A of the first wireless transmission and reception unit in S605 and the interference is detected in channel B of the second wireless transmission and reception unit in S606, the sensor node performs the channel change in channel A and channel B (S607). The sensor node may perform the channel change based on the channel hopping. In this case, the channel hopping coefficient applied to channel A and the channel hopping coefficient applied to channel B may be independently set. For example, the channel hopping coefficient applied to channel A may be set to j (0≤j≤7), and the channel hopping coefficient applied to channel B may be set to k (0≤j≤7). Specifically, for example, when the interference is detected in both channel A and channel B, the current channel of channel A and channel B is changed by hopping channel A by +j and hopping channel B by +k. In this case, the range of channel A may be set to 11≤channel A≤18, and the range of channel B may be set to 19≤channel B≤26. Furthermore, if $A_n+j \leq 18$ in channel A, the channel may be channel so that $A_{n+1}=A_n+j$, and if $A_n+j>18$, the channel may be changed so that $A_{n+1}=A_n+j-8$. Likewise, if $B_n+k \leq 26$ in channel B, the channel may be changed so that $B_{n+1}=B_n+k$, and if $B_n+k>26$, the channel may be changed so that $B_{n+1}=B_n+j-8$.

The channel hopping coefficients j and k may e set to a fixed value in which the interference is minimized after the channel changed according to the surrounding communication environment which influences the interference, or when the wireless environment is changed according to time, the coefficients j and k may be dynamically set with reference to the wireless environment change data or th interference detection frequency.

After the channel for channel A and channel B is changed, the sensor node performs the interference check for the two changed wireless channels A and B (S604), and operations S604 to S607 are performed according to whether the interference is detected and whether there is transmission data.

When there is the interference phenomenon in both channels of two wireless transmission and reception units, the channel change is performed based on the channel hopping for each of the two channel groups, and then the interference check is performed, and thus the channel change and the available frequency detection may be quickly performed.

Figure 7:
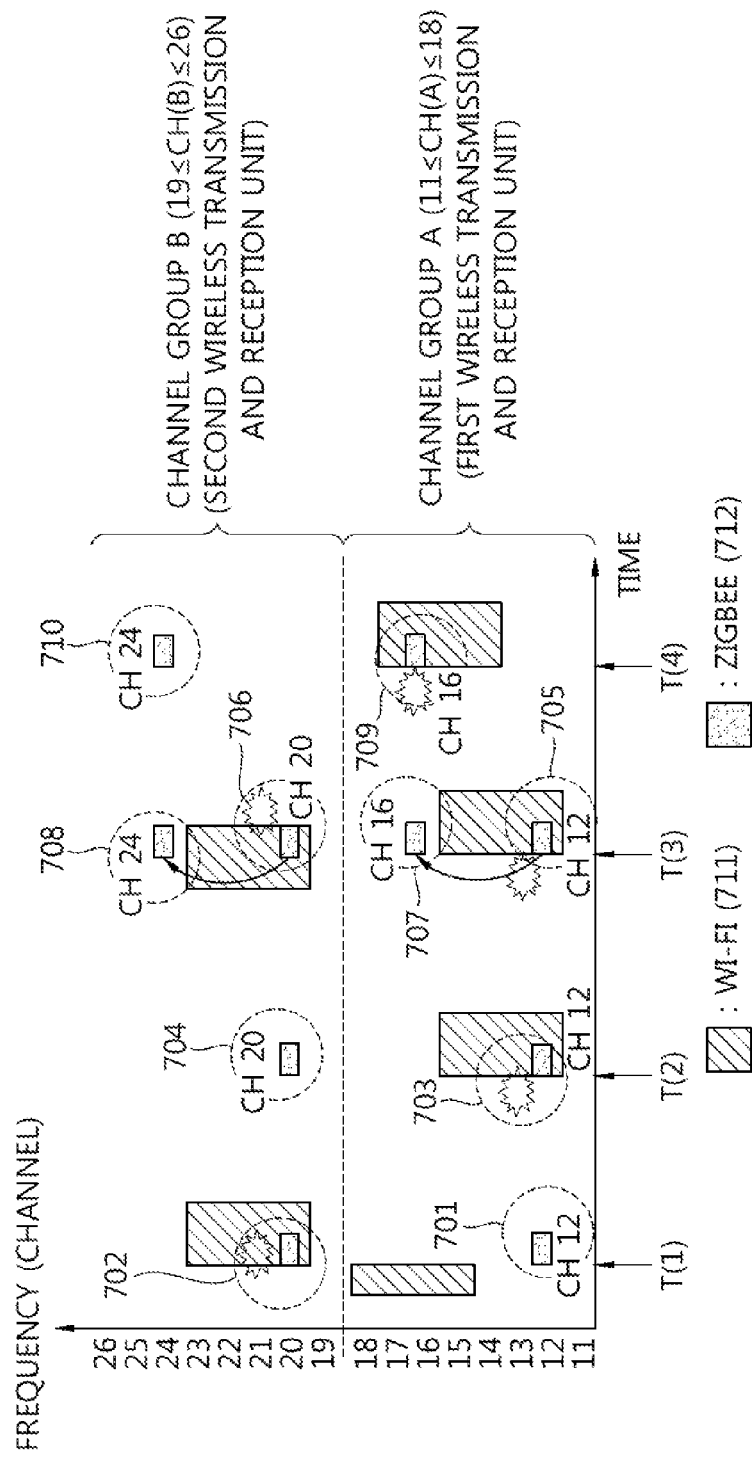
FIG. 7 shows an example of wireless channel interference avoidance of a multi transmission and reception sensor node, according to an embodiment of the present invention.

FIG. 7 shows an example of wireless channel interference avoidance of a multi transmission and reception sensor node, according to an embodiment of the present invention. The present embodiment divides 16 wireless channels into channel group A and channel group B, and the first wireless transmission and reception unit included in the sensor node is set to use 8 channels of channels 11 to 18 included in channel group A, and the second wireless transmission and reception unit is set to use 8 channels of channels 19 to 26 included in channel group B. Furthermore, FIG. 7 is an example where channel hopping coefficient j=4 and k=4.

Referring to FIG. 7, y-axis denotes the frequency band (channel), and x-axis denotes time. Furthermore, the dotted block 711 denotes the area where the Wi-Fi data (or packet) is transmitted, and the dotted block 712 denotes the area where the ZigBee data (or packet) is transmitted.

It is assumed that the first wireless transmission and reception unit is set to channel 12, and the second wireless transmission and reception unit is set to channel 20 when the sensor node is initialized.

Observing from the interference check time T1, the interference signal is not detected in the first wireless transmission and reception unit in area 701, but the interference signal is detected in the second wireless transmission and reception unit in area 702. In this case, the if there is data to be transmitted, the sensor node transmits data through channel 12, and the opponent reception sensor node may also receive data through channel 12.

Observing from the interference check time T2, the interference signal is detected in the first wireless transmission and reception unit in area 703, and the interference signal is not detected in the second wireless transmission and reception unit in area 704. In this case, the sensor node transmits data through channel 20 if there is data to be transmitted, and the opponent reception sensor node may also receive data through channel 20.

As we can see from T1 and T2, if the interference is not detected even at one of the two independent channels, the prompt data transmission is possible only with the selection of the transmission and reception unit without a channel change.

Furthermore, the interference phenomenon is simultaneously detected in channel 12 and channel 20 as in area 705 and area 706, the first wireless transmission and reception unit 1 and the second wireless transmission and reception unit perform the channel change to channel 16 and channel 24, respectively. When the two channels are simultaneously changed, the interference check is performed for the two changed channels, and when there is no interference as in area 707 and area 708, the data is transmitted through channel 16 (or channel 24).

Thereafter, in T4, when the interference for channel 16 is detected in area 709 and the interference for channel 24 is not detected in area 710, the sensor node may transmit data through channel 24 without performing the channel change procedure. In this case, the reception sensor node may also maintain the channel synchronization by performing the channel change according to the interference detection at the same synchronization time as that of the transmission sensor node.

According to the present invention, available channels are searched through a multi wireless transmission and reception unit and the wireless communication performed, and thus even when interference occurs in the channel of one wireless transmission and reception unit, the channel change may not performed in the wireless transmission and reception unit, and the wireless communication may be promptly performed through the available channels of another wireless transmission and reception unit, thereby preventing the transmission delay due to the interference.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method of avoiding channel interference by a sensor node including a multi transmission and reception unit in a wireless sensor network, the method comprising:

setting a channel A in a channel group A for a first wireless transmission and reception unit, and setting a channel B in a channel group B for a second wireless transmission and reception unit;

checking interference for the channel A;

checking interference for the channel B if interference is detected in the channel A;

performing communication through a channel, where interference has not been detected, among the channel A and the channel B;

hopping the channel A by a channel hopping coefficient j and hopping the channel B by a channel hopping coefficient k when interference is detected in both the channel A and the channel;

checking interference on the hopped channel A;

detecting interference on the hopped channel B if interference is detected in the hopped channel A; and performing communication through a channel, where interference is not detected, among the hopped channel A and the hopped channel B.

2. The method of claim 1, wherein the channel A and the channel B are different channels.

3. The method of claim 2, wherein some of 16 channels of channels 11 to 26 are included in the channel group A, and the remaining ones of the 16 channels are included in the channel group B, in a ZigBee wireless sensor network.

4. The method of claim 3, wherein the channel group A includes the channels 11 to 18, and the channel group B includes the channels 19 to 26.

5. The method of claim 1, wherein the channel hopping coefficients j and k are respectively set to one of 0 to 7.

6. A sensor node including a multi transmission and reception unit which performs channel interference avoidance in a wireless sensor network, the sensor node comprising:

a first wireless transmission and reception unit which checks interference on a channel A;

a second wireless transmission and reception unit which checks interference on a channel B; and a central controller which sets the channel A among channels included in a channel group A in the first wireless transmission and reception unit, and sets the channel B among channels included in a channel group B in the second wireless transmission and reception unit, wherein the central controller controls data to be transmitted or received through the first or second wireless transmission and reception unit in which a channel, where interference has not been detected, among the channel A and the channel B, is set, and wherein the central controller hops the channel A by a channel hopping coefficient j and hops the channel B by a channel hopping coefficient k when interference is detected in both the channel A and the channel B, the first wireless transmission and reception unit checks interference on the hopped channel A, the second wireless transmission and reception unit detects interference on the hopped channel B if interference is detected in the hopped channel A, and the central controller controls data to be transmitted or received through a wireless transmission and reception unit in which a channel, where interference is not detected, among the hopped channel A and the hopped channel B, is set.

7. The sensor node of claim 6, wherein the channel A and the channel B are different channels.

8. The sensor node of claim 7, wherein the central controller sets some of 16 channels of channels 11 to 26 to be included in the channel group A and sets the remaining ones of the 16 channels to be included in the channel group B, in a ZigBee wireless sensor network.

9. The sensor node of claim 8, wherein the central controller sets the channel group A to include the channels 11 to 18, and sets the channel group B to include the channels 19 to 26.

10. The sensor node of claimer 6, wherein the central controller sets the channel hopping coefficients j and k respectively to one of 0 to 7.

11. A method of avoiding channel interference by a sensor node including a multi transmission and reception unit in a wireless sensor network, the method comprising:

setting a channel A among channels included in a channel group A in a first wireless transmission and reception unit;

setting a channel B among channels included in a channel group B in a second wireless transmission and reception unit;

checking interference on the channel A through the first wireless transmission and reception unit;

checking interference on the channel B through the second wireless transmission and reception unit;

performing communication through the first or second wireless transmission and reception unit in which a channel, where interference has not been detected, among the channel A and the channel B, is set;

hopping the channel A by a channel hopping coefficient j and hopping the channel B by a channel hopping coefficient k when interference is detected in both the channel A and the channel B;

checking interference on the hopped channel A through the first wireless transmission and reception unit;

checking interference on the hopped channel B through the second wireless transmission and reception unit; and performing communication through a wireless transmission and reception unit in which a channel, where interference is not detected, among the hopped channel A and the hopped channel B, is set.

12. The method of claim 11, wherein the channel A and the channel B are set to be different channels.

13. The method of claim 12, wherein some of 16 channels of channels 11 to 26 are included in the channel group A, and the remaining ones of the 16 channels are included in the channel group B, in a ZigBee wireless sensor network.

14. The method of claim 13, wherein the channel group A includes the channels 11 to 18, and the channel group B includes the channels 19 to 26.

15. The method of claimer 11, wherein the channel hopping coefficients j and k are respectively set to one of 0 to 7.

16. The method of claim 11, wherein both the channel hopping coefficients j and k are set to 4.

17. The method of claim 11, wherein the channel hopping coefficients j and k are dynamically set based on a surrounding wireless environment change or interference detection frequency.

* * * * *